United States Patent
Man

(10) Patent No.: US 8,376,107 B2
(45) Date of Patent: Feb. 19, 2013

(54) FREEWHEEL ARRANGEMENT, IN PARTICULAR FOR A CRANK-CVT

(75) Inventor: Laszlo Man, Ottersweier-Unshurst (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/439,968

(22) Filed: Apr. 5, 2012

(65) Prior Publication Data

US 2012/0193181 A1 Aug. 2, 2012

Related U.S. Application Data

(63) Continuation of application No. PCT/DE2010/001051, filed on Sep. 6, 2010.

(30) Foreign Application Priority Data

Oct. 5, 2009 (DE) .......................... 10 2009 048 278

(51) Int. Cl.
F16D 41/07 (2006.01)
(52) U.S. Cl. ..................................... 192/45.1; 192/41 A
(58) Field of Classification Search .................. 192/45.1, 192/41 A; 188/82.8
See application file for complete search history.

(56) References Cited

U.S. PATENT DOCUMENTS

| 2,408,962 | A | | 10/1946 | Swanson et al. | |
|---|---|---|---|---|---|
| 2,599,793 | A | | 6/1952 | Warner | |
| 2,820,537 | A | * | 1/1958 | Sauzedde | 192/45.1 |
| 2,954,855 | A | * | 10/1960 | Lund | 192/45.1 |
| 3,124,228 | A | * | 3/1964 | Candela | 192/45.1 |
| 3,363,733 | A | * | 1/1968 | Titt | 192/45.1 |
| 3,487,899 | A | * | 1/1970 | Bass et al. | 192/45.1 |
| 5,782,329 | A | | 7/1998 | Muramatsu et al. | |
| 6,584,874 | B1 | | 7/2003 | Wade et al. | |

FOREIGN PATENT DOCUMENTS

| DE | 69326387 T2 | 3/2000 |
|---|---|---|
| DE | 10243533 A1 | 4/2003 |
| EP | 1650071 A2 | 4/2006 |
| FR | 2 178 664 A5 | 11/1973 |
| JP | 59 151630 A | 8/1984 |

* cited by examiner

Primary Examiner — Richard M. Lorence
(74) Attorney, Agent, or Firm — Lucas & Mercanti, LLP; Klaus P. Stoffel

(57) ABSTRACT

A freewheel arrangement, in particular for a crank-CVT, which has an inner ring, an outer ring, which can be rotated relative to the inner ring in at least one direction of rotation and which is arranged radially around the inner ring, several cam-shaped clamping elements, which have a foot area and a head area and are arranged between the inner ring and the outer ring in a cage and can be acted on in the direction of the inner ring by a radially inwardly directed spring force of a spring. The spring is a double-acting torsion spring, which simultaneously acts on the head area and the foot area of adjacent clamping elements and presses the clamping elements radially inward.

9 Claims, 3 Drawing Sheets

FREEWHEEL ARRANGEMENT, IN PARTICULAR FOR A CRANK-CVT

CROSS-REFERENCE TO RELATED APPLICATIONS

This application is a continuation of PCT/DE2010/001051 filed Sep. 6, 2010, which in turn claims the priority of DE 10 2009 048 278.4 filed Oct. 5, 2009. The priority of these applications is hereby claimed and these applications are incorporated by reference herein

FIELD OF THE INVENTION

The present invention relates to a freewheel arrangement, in particular for a crank-type CVT.

BACKGROUND OF THE INVENTION

A CVT is a uniform-motion transmission in which the ratio of the rotational speeds of the driving shaft and of the driven shaft, the transmission ratio, can assume an infinite number of values (stages) in a certain range. This may also include the standstill state or the rotational direction reversal of a shaft. The transmission of the movement takes place via a non-rigid coupling of components, the geometries of which determine the transmission action according to the lever principle. A change in transmission ratio is obtained by a change in the component geometries, which however at the same time cannot take place without a change in the geometries at the location of the component coupling.

Numerous freewheel devices for crank-type CVTs have, for this purpose, clamping bodies which are arranged between an inner ring, which is formed by a region of the drive output shaft, and an outer ring. Here, the surfaces of the outer ring and of the inner ring are coordinated with one another such that, in one direction of relative rotation between the inner ring and outer ring, the clamping bodies can block the rotation, such that the outer ring and the inner ring are rotated together. In the other direction of relative rotation between the outer ring and the inner ring, no blocking action is effected by the clamping bodies. The individual clamping bodies are loaded in the blocking direction, which may be realized by means of at least one spring element.

A crank-type CVT having roller-shaped clamping bodies is known, for example, from EP 1 650 071 A2. The rollers are forced into the gap between the inner star and the outer ring by a spring as a pressure-exerting, element and, as a result of which, the rollers, as clamping elements, are held in contact with the outer ring and inner star. Here, a cage is provided for the rollers. Here, the spring may be designed as a leg spring where the switching action is attained by virtue of the spring or the leg spring performing a pivoting movement, which causes the roller to be pushed from the right flank, which is associated therewith, onto the left flank.

DE 102 43 533 A1 describes a switching device which serves for switching the blocking function of the freewheel. The switching device comprises a plurality of switching units arranged between adjacent rotationally symmetrical clamping bodies. The switching units can be actuated synchronously and have switching means which have a rotatable disk-shaped region and also a profiled region composed preferably of a profiled bar. The profiled region has a leg spring, which can be braced between the profiled region and a clamping body. For this purpose, the leg spring has a leg which can load a clamping body in the corresponding blocking direction.

The spring-loading and damping (for example, as per DE 693 26 387 T2) may furthermore be realized by so-called Z-springs which are supported at one side on the radially outer surface of the clamping body and at the other side on a contact surface of the cage.

Also known is the use of Z-springs which, in the damping position, act with one leg on the radially outer region of a clamping body and with a second leg on the radially inner region of an adjacent clamping body where in the maximum pivoting position, there is no longer contact between the first leg and the clamping body.

The abovementioned solutions have the disadvantage that, as a result of the single-acting leg springs, the damping and centrifugal force compensation cannot be fully utilized, or that the compensation can be achieved only with a large loss in efficiency, or that, with the Z-springs, there is the risk of lifting of the clamping bodies at full torque. A further disadvantage of the design is that the Z-springs require a greater amount of installation space, which can be is compensated for by reducing the number of clamping bodies, but this in turn reduces the load capacity.

SUMMARY OF THE INVENTION

It is an object of the present invention to develop a freewheel arrangement, in particular for a crank-type CVT, by which the spring loading and the damping of the clamping bodies at high load can be ensured, and, at the same time, the centrifugal force should be compensated and the lifting of the spring from the clamping body at high load should be prevented.

Said object is achieved by means of the independent patent claim. Advantageous refinements emerge from the subclaims.

Broadly, the present invention relates to a freewheel arrangement, which is used in particular for a crank-type CVT, that comprises an inner ring, an outer ring which is rotatable relative to the inner ring and which is arranged radially around the inner ring, and a plurality of cam-shaped clamping bodies which have a foot region and a head region and which are arranged between the inner ring and the outer ring in a cage and which can be loaded in the direction of the inner ring by a radially inwardly acting spring force of a spring. The spring is designed as a double-acting leg spring, which acts simultaneously on the head region and on the foot region of adjacent clamping bodies and which presses the clamping bodies radially inward.

Here, the characteristic curve of the leg spring and of the leg, which acts on the head region, should advantageously be long enough to ensure permanent contact, at least in the head region of the clamping body, at all operating points.

In a preferred embodiment, the leg spring acts both on the head region and also on the foot region of two adjacent clamping bodies over the entire range of deflection of the clamping bodies, such that the head region and the foot region of the clamping bodies are pressed radially inward in the direction of the inner ring at all operating points.

For this purpose, the leg spring advantageously has a large number of windings, which ensures a correspondingly long spring characteristic curve. For this purpose, the leg spring has a first region with a multiplicity of windings, at the two ends of which region is arranged in each case one first leg spring which is angled in the direction of a clamping body and which engages on the foot region.

Furthermore, the leg spring has, approximately in the center of the first region with the windings, a radially outwardly extending second leg spring which substantially is angled counter to the first spring leg in the direction of the head region of the adjacent clamping body and which acts on said head region.

Here, the second leg spring is designed such that it can cover a greater spring travel than the first spring leg, and in so doing acts permanently on the head region radially under preload, since the head region travels through a larger pivoting range than the foot region of the clamping body. By means of said special design of the leg spring, permanent contact both between the first leg and the foot region and also between the second leg and the head region is ensured.

To ensure permanent contact against the foot region of a clamping body, the two first legs initially, in a first portion, extend substantially rectilinearly in the direction of the foot region of the clamping body, and subsequently, in a second portion, are angled radially outward, such that the radially inwardly pointing side of the second portion of the first leg acts with the radially inwardly directed spring force on the foot region.

To ensure the permanent contact with the head region of an adjacent clamping body, the second leg has the following portions: initially, a third portion with a radius pointing radially outward in the direction of extent of the first leg, a fourth portion which points substantially rectilinearly radially outward and in the direction of the adjacent clamping body, and a fifth portion which is angled further in the direction of the adjacent clamping body and oppositely to the extent of the first leg and which acts on the head region of the adjacent clamping body with a radially inwardly directed spring force.

The structural design of the double-acting leg spring takes up a very small installation space such that the number of clamping bodies need not be reduced (in relation to the use of conventional clamping bodies), and therefore the load capacity of the freewheel arrangement is maintained.

The arrangement of the leg springs on the cage is realized preferably by means of a bolt which extends through the first region of the leg spring with the windings and which is fastened with both ends to the cage.

In a known way, the cage has radially inwardly pointing sliding elements with sliding surfaces along which the lateral foot region of the clamping bodies slides, wherein the first region of the leg springs with the windings is, by means of the corresponding bolt, arranged substantially radially at the outside over the sliding elements.

Through the use, according to the invention, of a double-acting leg spring which presses against the clamping body both in the foot region and in the head region, a high damping capability is utilized.

The long spring characteristic curve ensures an insensitivity to tolerances and, as a result of the permanent spring contact, a long service life. It is furthermore advantageous that the spring requires a small amount of installation space, as a result of which a reduction in the number of clamping bodies is not necessary and a high load capacity is ensured. With the solution according to the invention, maximum utilization of the damping and centrifugal force compensation is possible in a small installation space, wherein the lifting of the springs from the clamping bodies at full torque is prevented.

The spring force of the double-acting leg spring may be freely varied in accordance with the pressure force to be exerted on the clamping bodies.

BRIEF DESCRIPTION OF THE DRAWINGS

The invention will be explained in more detail below on the basis of an exemplary embodiment and associated drawings, in which.

DETAILED DESCRIPTION OF THE INVENTION

Figure 1:
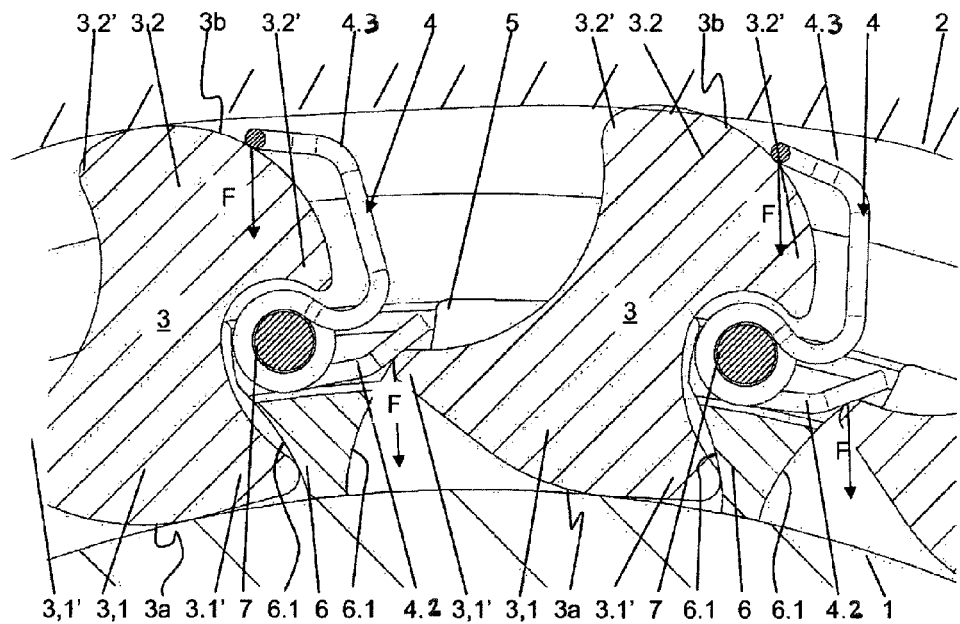
FIG. 1 is a sectional illustration through a clamping body and a leg spring of a freewheel in a damping position.
Figure 2:
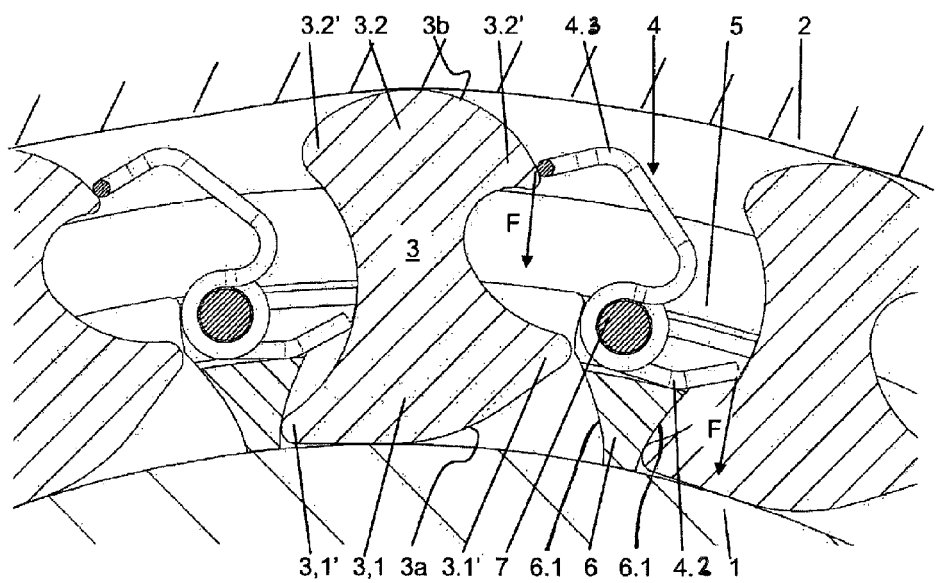
FIG. 2 is a sectional illustration through a clamping body and a leg spring of a freewheel at maximum deflection.

FIGS. 1 and 2 show the detail of the cross-section of a freewheel arrangement through cam-shaped clamping bodies 3 arranged between the inner ring 1 and outer ring 2 in a cage 3. The clamping bodies 3 have a region which narrows in the middle in cross-section. The clamping body 3 has, in the direction of the inner ring, a widening foot region 3.1 with first projections 3.1' and, in the direction of the outer ring 2, a widening head region 3.2 with second projections 3.2'. The clamping body 3 acts with a first contact surface 3a on the inner ring 1 and with a second contact surface 3b on the outer ring 2. The clamping bodies 3 are seated in a freewheel cage 5, and the axially outwardly pointing first projections 3.1' of the foot region 3.1 are guided by sliding elements 6 arranged on sliding surfaces 6.1 on the cage 5.

A leg spring 4, which is fastened to the cage 5 by means of a pin 7, acts on two adjacent clamping bodies 3. Here, the leg spring has a first region 4.1 with windings, through which first region the pin 7 extends. With a first leg 4.2, the leg spring 4 acts on the clamping body 3 arranged to the right thereof in the illustration of FIG. 1. More specifically, the leg spring 4 acts in the region of the radially outer first projection 3.1' of the foot region 3.1 of the clamping body 3, and pushes the foot region 3.1 in the direction of the inner ring 1.

With the second leg 4.3, which extends radially outward and in the direction of the head region 3.2 of the clamping body arranged at the left in the illustration, the leg spring 4 acts with a spring force on the head region 3.2 and pushes the head region 3.2 likewise in the direction of the inner ring.

Here, FIG. 1 illustrates the damping position, and FIG. 2 illustrates the maximum deflection of the clamping bodies 3 in the opposite direction. It can be seen that, over the entire range of deflection of the clamping bodies 3, both the first leg 4.2 always acts against the foot region 3.1, and also the second leg 4.3 always acts against the head region 3.2 of the clamping body 3, with a spring force directed radially in the direction of the inner ring 1. Here, the second leg 4.3 is bent such that, in the damping position according to FIG. 1, the second projection 3.2', which points in the direction of said second leg, of the head region 3.2 can at least partially engage into the second leg 4.3.

Figure 3:
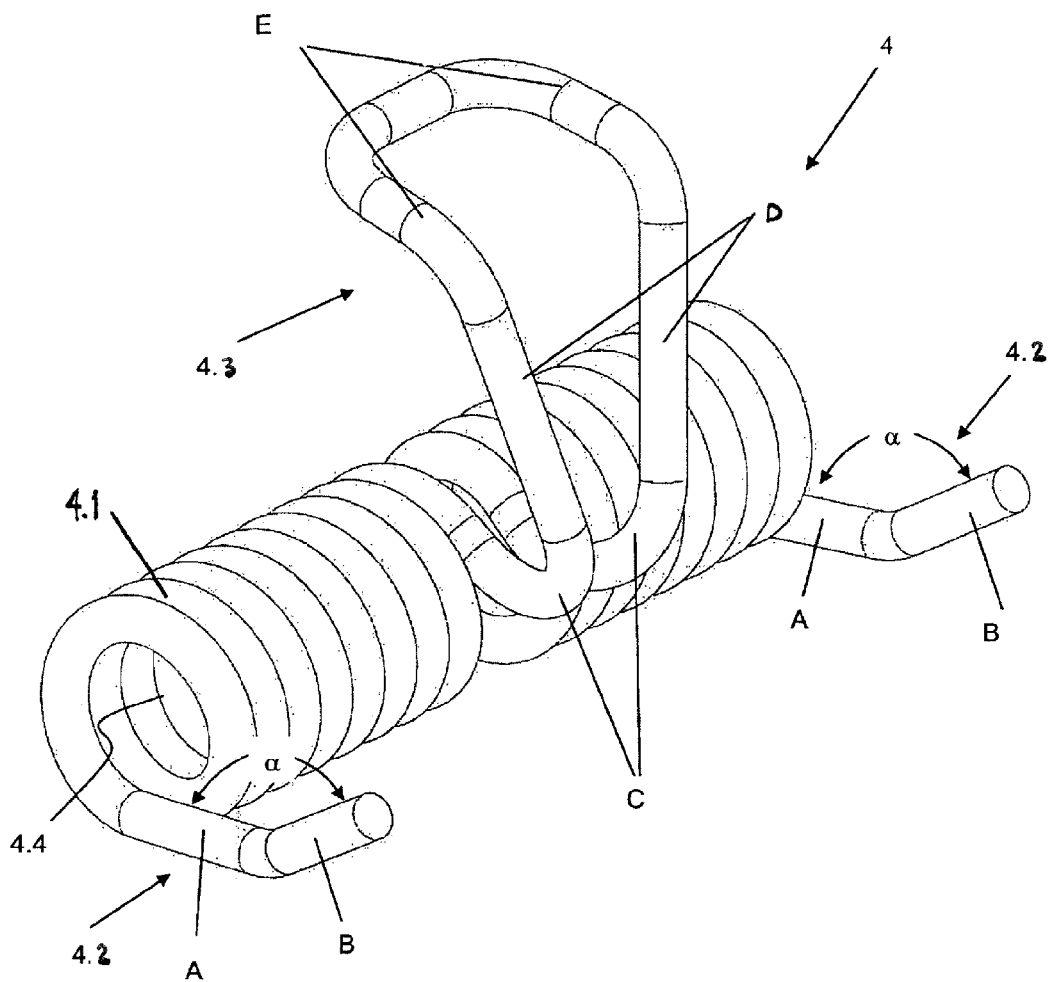
FIG. 3 is the three-dimensional illustration of a double-acting leg spring.

FIG. 3 is the three-dimensional illustration of a double-acting leg spring 4. The illustration of the leg spring 4 is shown in FIG. 2. The leg spring 4 is helically curved in a first is region 4.1 and, in said region, has a through opening 4.4 which serves for fastening to the cage. The first, curved region is adjoined at the outside at both ends by one first leg 4.2. Approximately in the center, the second leg 4.3 extends upward in the illustration from the first region 4.1.

To ensure permanent contact against the foot region 3.1 and against the head region 3.2 of a clamping body 3 at all operating points, the legs 4.2, 4.3 of the leg spring 4 have, in particular, the structural design described below:

The Two First Legs 4.2 Have:

a first portion A which adjoins the first region 4.1 and which extends substantially rectilinearly in the direction of the foot region of a clamping body (not illustrated here), and a portion B which adjoins the first portion A and which is angled radially outward in relation to the first portion A by an obtuse angle α and which is in permanent operative contact with the foot region of the clamping body (not illustrated here).

The Second Leg 4.3 Has:
  initially a third portion C with a radius pointing radially outward in the direction of extent of the first leg 4.2,
  a fourth portion D which points substantially rectilinearly radially outward and in the direction of the adjacent clamping body (not illustrated here), and
  a fifth portion E which is angled further in the direction of the adjacent clamping body (not illustrated here) and oppositely to the extent of the first leg and which acts on the head region of the adjacent clamping body (not illustrated here) with a radially inwardly directed spring force.

Figure 4:
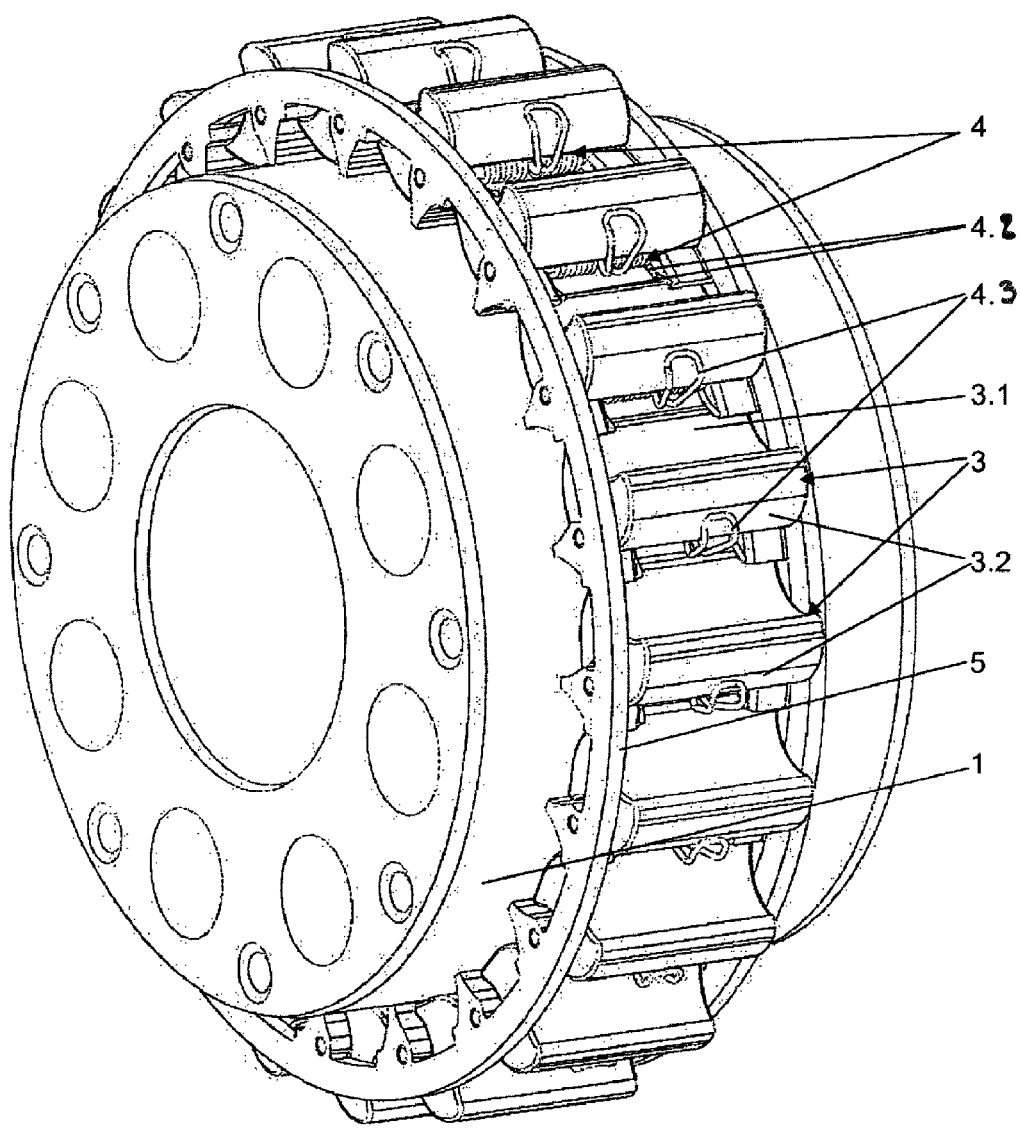
FIG. 4 is a three-dimensional illustration of an inner ring and of a cage with leg springs fastened thereto.

The inner ring 1 and the cage 5 with the clamping bodies 3 and leg springs 4 fastened thereto are illustrated in FIG. 4. It can be seen from said figure that the first leg 4.2 acts on the foot region 3.1 and the second leg 4.3 acts on the head region 14 of the adjacent clamping body 3. Here, in the damping position illustrated, the second leg 4.2 engages partially around the head region 3.2 of the clamping body 2.

LIST OF REFERENCE SYMBOLS

1 Inner Ring
2 Outer Ring
3 Clamping Body
3.1 Foot Region
3.1' First Projections of the Foot Region
3.2 Head Region
3.2' Second Projections of the Head Region
4 Leg Spring
4.1 First Region
4.2 First Leg
4.3 Second Leg
4.4 Opening
5 Cage
6 Sliding Element
6.1 Sliding Surfaces
7 Pin
A First Portion
B Second Portion
C Third Portion
D Fourth Portion
E Fifth Portion
F Spring Force

What is claimed:

1. A freewheel arrangement for a crank-type CVT, comprising:
  an inner ring;
  an outer ring, which is rotatable relative to the inner ring in at least one direction of rotation and which is arranged radially around the inner ring;
  a cage;
  a spring; and
  a plurality of cam-shaped clamping bodies, which have a foot region and a head region, are arranged between the inner ring and the outer ring in the cage and can be loaded in a direction of the inner ring by a radially inwardly acting spring force of the spring,
  wherein the spring is a double-acting leg spring which acts simultaneously on the head region of a first clamping body of the clamping bodies and the foot region of a second clamping body of the clamping bodies, the first and second clamping bodies being adjacent to each other, and the spring presses both the first and second clamping bodies radially inward.

2. The freewheel arrangement as claimed in claim 1, wherein the leg spring has a characteristic curve with a length that ensures permanent contact, at least in the head region of the first clamping body, at all operating points.

3. The freewheel arrangement as claimed in claim 1, wherein the leg spring acts, respectively, on the head region and the foot region of the first and second clamping bodies over an entire range of deflection of the clamping bodies.

4. The freewheel arrangement as claimed claim 1, wherein the leg spring has a plurality of windings, which provides a long spring characteristic curve.

5. The freewheel arrangement as claimed in claim 1, wherein the leg spring has a first region with windings, at each end of the region is a first spring leg, which extends from the winding and is angled in a direction of the foot region of the second clamping body and engages with the foot region, and wherein the leg spring has, a radially outwardly extending second spring leg substantially centrally located in the first region, which is angled counter to the first spring leg in a direction of the head region of the first clamping body and which acts on the head region.

6. The freewheel arrangement as claimed in claim 5, wherein the first spring legs initially, in a first portion, extend substantially rectilinearly in the direction of the foot region of the second clamping body, and subsequently, in a second portion, are angled radially outward.

7. The freewheel arrangement as claimed in claim 6, wherein the second spring leg initially, in a third portion, in a direction of the first spring leg, has a radially outwardly pointing radius, the third portion is adjoined by a fourth portion, which points substantially rectilinearly radially outward and in a direction of the first clamping body, and sequentially following the fourth portion, the second leg has a fifth portion, which is angled further than the fourth portion, in the direction of the first clamping body and acts on the head region of the first clamping body.

8. The freewheel arrangement as claimed in claim 5, further comprising a bolt, wherein the leg spring is fastened to the cage by the bolt, which extends through the region of the leg spring with the windings.

9. The freewheel arrangement as claimed in claim 1, wherein the cage has radially inwardly pointing sliding elements with sliding surfaces, the foot region of the clamping bodies slide along the sliding surfaces of the sliding elements of the cage, and the first region of the leg springs is arranged substantially radially at an outside over the sliding elements.

* * * * *